United States Patent [19]

Ishida et al.

[11] 4,171,108
[45] Oct. 16, 1979

[54] SPINNING TYPE FISHING REEL

[75] Inventors: Takuo Ishida, Sennan; Masuo Ban, Sakai, both of Japan

[73] Assignee: Shimano Industrial Company Limited, Osaka, Japan

[21] Appl. No.: 895,381

[22] Filed: Apr. 11, 1978

[30] Foreign Application Priority Data

Apr. 19, 1977 [JP] Japan .................................. 52/45258
Jun. 7, 1977 [JP] Japan .................................. 52/67511
Jun. 7, 1977 [JP] Japan .................................. 52/67512

[51] Int. Cl.² ............................................. A01K 89/01
[52] U.S. Cl. ................................................ 242/84.2 G
[58] Field of Search ................... 242/84.2 G, 84.21 R, 242/84.21

[56] References Cited

U.S. PATENT DOCUMENTS

| 2,777,645 | 1/1957 | Wood | 242/84.21 R |
| 2,799,457 | 7/1957 | Martini | 242/84.21 R |
| 3,987,976 | 10/1976 | Lilland | 242/84.21 R |

FOREIGN PATENT DOCUMENTS

| 1011658 | 7/1957 | Fed. Rep. of Germany | 242/84.2 G |
| 1213235 | 10/1959 | France | 242/84.2 G |

*Primary Examiner*—Billy S. Taylor
*Attorney, Agent, or Firm*—Stevens, Davis, Miller & Mosher

[57] ABSTRACT

Disclosed is an arrangement for shifting a bail arm in a longitudinal direction relative to the spool of a spinning type fishing reel. A spinning type fishing reel generally has a bail arm mounted at both its opposite ends around a rotary frame so that an intermediate portion of the arm is swingable across the front of a spool. The swing axis of respective ends of the bail arm are made slant backwardly of the reel with respect to a plane lying perpendicular to the axis of rotation of the rotary frame so that the intermediate portion may, when swinging, be shifted radially forwardly of the spool.

11 Claims, 4 Drawing Figures

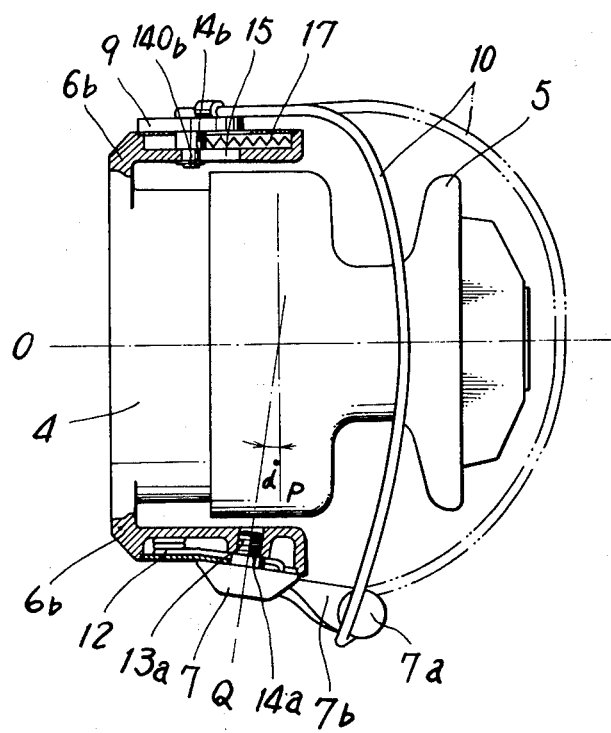

SPINNING TYPE FISHING REEL

This invention relates to a spinning type fishing reel and more particularly to the spinning type fishing reel carrying a semicircular bail arm which is mounted around a rotary frame so as to be swung between two bail arm positions, one position being where a fishing line is guided to be wound onto a spool and the other position being where a line is released to be drawn out therefrom.

It is known that a spinning type fishing reel preferably has a short mounting leg to mount the reel to a fishing rod as close as possible so that an operating handle may steadily be turned to wind up the line smoothly, thereby enabling the line to be wound at high speed, while permitting accurate and distant casting. The problem with a short leg, however, is that it allows the rod to hit the intermediate portion of bail arm when the latter rotates. This can be avoided by attaching the bail arm as close as possible to the rotary frame. However, when this is done the bail arm happens to hit the spool, when turned over, to thereby hinder its swing across the front thereof. Ironically, the the axis of swinging motion of the ball arm is shifted axially forwardly of the spool so as to enable the arm to swing without hindrance, this causes a problem in that it becomes difficult to uniformly wind the line on the spool.

In other words, when the line guide position of the bail arm is shifted following the forwardly shifted axis of swinging motion, the axial reciprocation of the spool becomes improper with respect to the line guide position of the bail arm, resulting in that the line cannot be uniformly wound following the axial reciprocation of spool. Also, the bail arm becomes larger in its angle of swing making its automatic turnover difficult from the line releasing position, and a torsion spring has a diminished retaining force for keeping the bail arm in position. As a result, it is impracticable to shift the axis of swing of the bail arm forwardly of the spool.

This invention has been designed in view of the aforesaid problems. An object of the invention is the provision of a spinning type fishing reel which is, when attached to a rod for fishing, capable of having its operating handle turned steadily while permitting the casting of a well-balanced rod accurately over a great distance.

The invention is characterized in that a spinning type fishing reel having a bail arm which is mounted around a rotary frame to be swung at the intermediate portion of the arm across the front of the spool between the line winding and releasing positions, is adapted to allow the bail arm to swing around studs which are slant longitudinally of the reel body with respect to a plane lying perpendicular to the axis of rotation of the rotary frame in such a manner that the studs extend at the heads thereof outwardly of the rotary frame and backwardly of the reel body, whereby when the bail arm is swung between the line winding and releasing positions the intermediate portion of the arm is shifted around the studs radially of the spool at the front thereof.

Hence, the intermediate portion is, when the bail arm is swung, shifted so as to move apart from the spool, thereby being turned over without hinderance. As a result, the bail arm can be made smaller in its radius to the extent that the intermediate portion extends from the spool, thus enabling the reel body to approach the rod through use of a short mounting leg.

These and other objects, features and advantages of the invention will become more apparent upon a reading of the following detailed description and drawings, in which:

FIGS. 3 and 4 are plan views of modified embodiments of the invention, which are partially cutaway correspondingly to FIG. 2 respectively.

Figure 1:
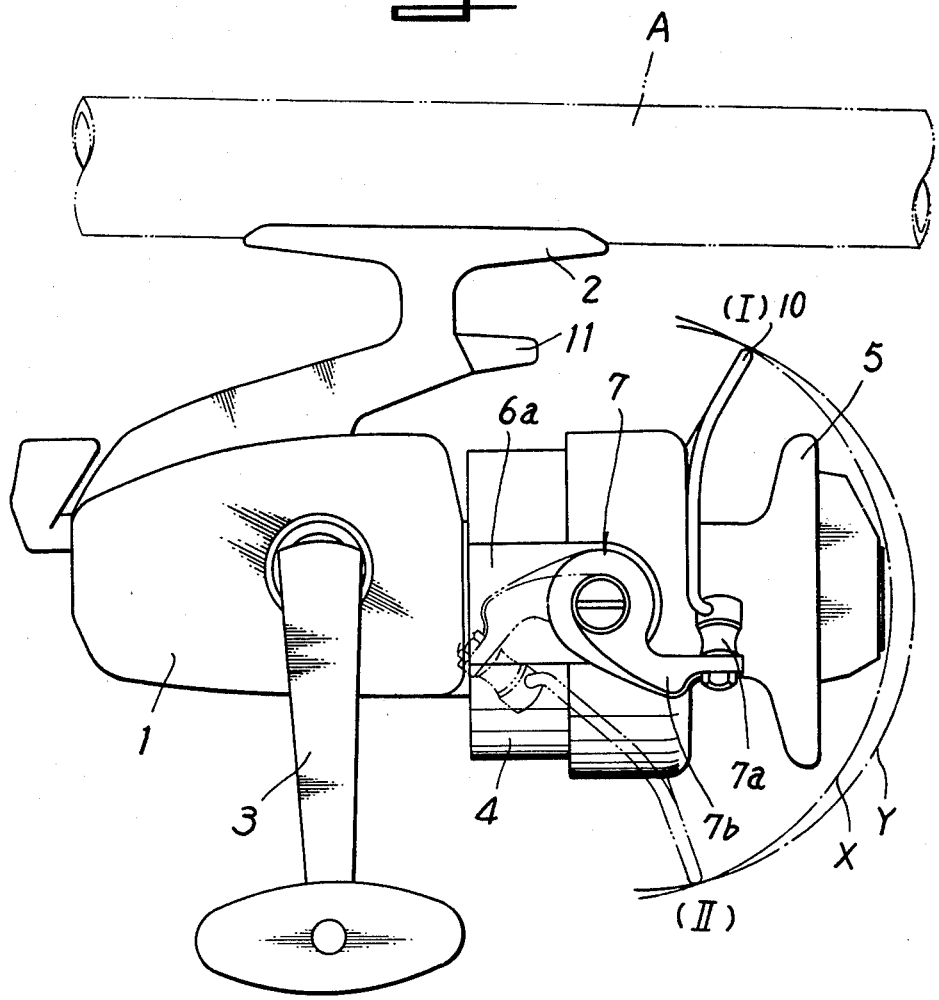
FIG. 1 is a side view of an embodiment of the reel of the invention.

Referring to the drawings, the reference numeral 1 designates a reel body having a mounting leg 2 through which the reel is mounted to a fishing rod A. To the reel body 1 are journaled a handle shaft (not shown) having a crank handle 3 attached thereto widthwise of the reel body 1 and a tubular shaft (not shown) having a cylindrical rotary frame 4 attached thereto longitudinally of the reel body 1. The tubular shaft is connected in association with the handle shaft which is turned to rotate the rotary frame 4. A spool shaft (not shown) carrying a spool 5 is insertably supported with the tubular shaft in relation of being axially reciprocated, the spool shaft being connected to the handle shaft in association therewith through a rotation-reciprocation machanism to thereby allow the spool 5 to reciprocate axially.

A pair of support arms 6a and 6b are provided diametrically opposite to each other around the rotary frame 4 so as to extend forwardly thereof. One support arm 6a carries a first support 7 having an arm roller 7a and arm cam 7b, and the other 6b carries a second support 9. A bail arm 10 formed of a semicircular wire is attached at its first terminal to the arm roller 7a and at its second terminal to the second support 9 so that the bail arm 10 may be swung in such a manner that the intermediate portion thereof passes across the front of the spool 5 between the position I, as shown by the solid line in FIG. 1, where the line is guided to be wound onto the spool and the position II, as shown by the phantom line, where the line is released to be drawn out therefrom. The bail arm 10 at the position I is rotated together with the rotary frame 4 to wind up the line onto the spool 5 and is turned over in swinging motion from the position I to that II to release the line to be drawn out therefrom for casting. The reference numeral 11 designates a projection attached to the mounting leg 2 which hits the arm cam 7b to thereby turn over the bail arm 10, and 12 designates a torsion spring for keeping the bail arm 10 in the two positions I and II.

The reel construction as described above is in principle well-known, hence, it will be easily understood without a further detailed description.

In the spinning type fishing reel of the invention, the axis Q of each of the studs around which the bail arm 10 swings, is made slant longitudinally backwardly of the reel at an angle of $\alpha°$ with respect to the perpendicular plane P to the axis of rotation of the rotary frame 4.

Figure 2:
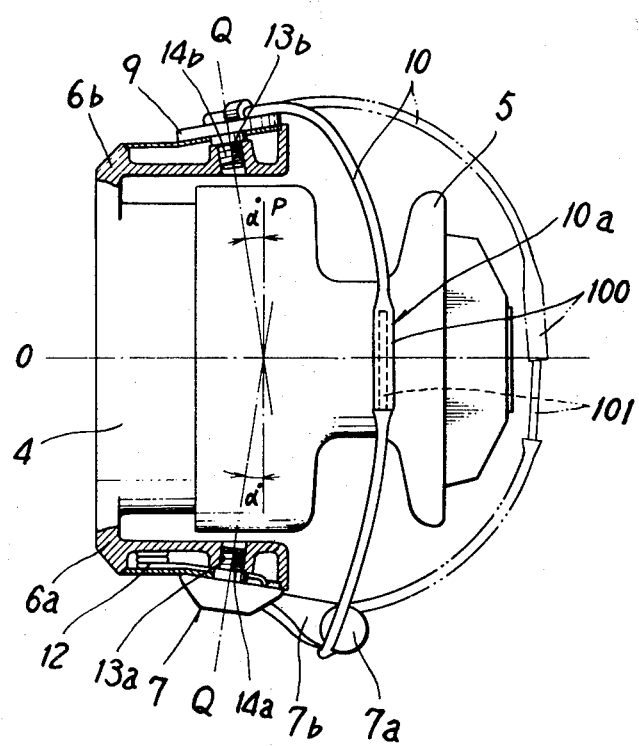
FIG. 2 is a partially omitted and cutaway plan view thereof.

Referring to FIG. 2, the support arms 6a and 6b are provided with threaded bores 13a and 13b respectively. The bores 13a and 13b are slanted by the angle $\alpha°$. Respective first and second studs 14a and 14b having threaded and round portions are screwed into bores 13a and 13b. First and second supports 7 and 9 are respectively rotatably supported to the studs 14a and 14b.

Each of the studs 14a and 14b, as seen from FIG. 2, has its head positioned outwardly radially of the rotary frame 4 and slanted longitudinally backwardly thereof so that the intermediate portion 10a of the bail arm 10 is, when turned over, shifted radially forwardly of the spool 5 and moved remotely therefrom.

Also, referring to FIG. 2, the bail arm 10 is separated at its intermediate portion 10a so as to allow both separated ends thereof to part from each other when the bail arm 10 is turned over, so that the intermediate portion 10a is remote from the spool and does not interfere with it.

The separating portion of the intermediate portion 10a as shown in FIG. 2, comprises one end of a tube 100 having a bore and one end of a rod 101 fitting into the tube 100, the tube and rod being connected in relation of being telescopic. Hence, the bail arm 10 is, when turned over, elongated at the intermediate portion 10a by moving to the position as shown by the dot and dashed lines from that shown by the solid line in FIG. 2, thereby being extended away from the spool 5.

In the above embodiment, the separating portions including both the tube and rod are designed to entirely part or separate from each other, but the separating portions may be designed to completely separate one from the other. Both the tube 100 and rod 101 may be replaced by an elastically deformable flexible body 102 (FIG. 3), such as rubber. It is preferable for reliably preventing the line from escaping from the bail arm 10 to use the tube 100 and rod 101 or the flexible body 102 for connecting both the separate ends instead of allowing them to be merely opened.

The two separating ends, not shown in the drawing, may also be overlapped in a given length to be slidably movable relative to one another when the bail arm is turned over, whereby the bail arm is kept from being disconnected even when fully elongated. With this arrangement the aforesaid telescopic construction (FIG. 2) is not required but each of the separate ends is slightly extended.

Figure 3:
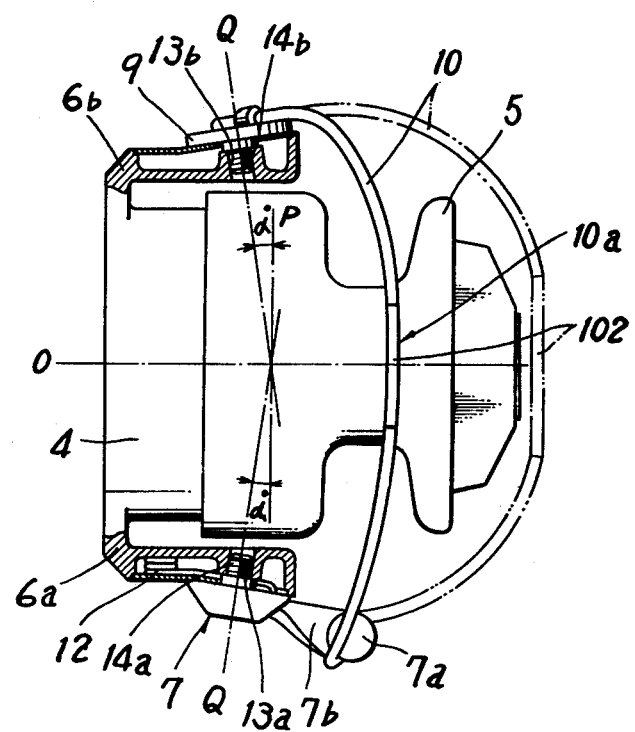

In the described embodiments, the studs 14a and 14b are slanted at the axes thereof longitudinally backwardly of the reel by the angle α° to allow the bail arm to be, when swinging, elongated as shown by the dot and dash lines in FIGS. 2 and 3, whereby the locus Y of the crest of bail arm in swinging motion extends forwardly more than the locus X of a conventional bail arm. Hence, the bail arm 10 which is close to the rotary frame 4 has a smaller radius so as not to be hit by the spool 5 when swinging between the two positions I and II.

Also, the small radius bail arm allows the mounting leg to be short so that the whole reel may be mounted close to the rod A, without the rotating bail arm hitting the rod.

The invention is not limited to the above described embodiments in which both the first and second studs 14a and 14b carrying both ends of the bail arm 10 are slanted backwardly of the reel with respect to the perpendicular to the axis of rotation of the rotary frame 4 with the bail arm rotating around the slant axes of the same. For example, only one of the studs 14a and 14b need be slanted as described. In this instance, the bail arm 10 is separated near the other not-slant stud rather than at an intermediate portion. Alternatively, the not-slanted stud 14b is, as shown in FIG. 4, preferably axially movably supported with respect to the rotary frame 4.

In greater detail, the support arm 6b is, as shown in FIG. 4, provided with a slot 15 elongated axially of the rotary frame 4 and the second stud 14b is extended inwardly to form a pin 140b so that the pin 140b is inserted into the slot 15 in relation of being axially movable and rotatable. Also, between the stud 14b and the fore end of the slot 15 is inserted a spring 17 for urging the former toward the rear end of the slot 15.

This construction allows the stud 14b to move through the slot 15 forwardly of the reel when the bail arm 10 swings, thus functioning the same as in the former embodiment.

Also, in this construction, the second stud 14b may be replaced by an extension of one end of the bail arm 10.

As seen from the aforesaid description, a spinning type fishing reel constructed in accordance with the invention has a bail arm which is smaller in diameter than conventional bail arms. Thus, the smaller bail arm can approach the rotary frame and not project too far outwardly thereof, and such the smaller diameter bail arm can swing between the line winding and releasing positions through the front of the spool without hitting the same. Hence, the whole reel is attachable close to the fishing rod by the mounting leg which is made smaller to the extent that the bail arm approaches the rotary frame, whereby the operating handle is turned smoothly and steadily and an accurate and distant cast can be made by use of a well-balanced rod.

While several embodiments of the invention have been shown and described, the invention is not limited to the specific construction of these exemplary embodiments, but is rather defined solely by the appended claims.

What is claimed is:

1. A fishing reel comprising;
   a reel body having a handle projecting therefrom and a mounting leg for mounting said reel body to a fishing rod;
   a cup-like shaped rotary frame rotatably supported to said reel body at the front thereof;
   a spool supported to the front of said reel body by means causing said spool to move longitudinally of said reel body upon movement of said handle;
   a bail arm of semicircular shape for guiding a fishing line wound on said spool including an intermediate portion and two end portions; and,
   means for pivotably mounting said bail arm to said rotary frame so that said bail arm can swing with its intermediate portion passing across the front side of said spool comprising:
   a pair of arm supports coupled to said rotary frame and located at opposite sides of said rotary frame,
   a pair of studs respectively mounted to said arm supports, each of said studs having its axis slanted with respect to a plane lying perpendicular to the axis of rotation of said rotary frame with its head positioned outwardly of said rotary frame and facing backwardly thereof, and
   means for respectively pivotably coupling said two end portions of said bail arm to said studs, whereby when said bail arm is swung about said studs, said intermediate portion thereof is shifted radially to pass across the front side of said spool.

2. The fishing reel as set forth in claim 1, wherein said bail arm has separating portions at its intermediate portion, said separating portions, when said bail arm is swung, moving apart from each other as said intermediate portion passes across the front of said spool.

3. The fishing reel as set forth in claim 2, wherein said separating portions of said bail arm are formed as a telescopic member.

4. The fishing reel as set forth in claim 3, wherein said telescopic member comprises elastically deformable material.

5. The fishing reel as set forth in claim 3, wherein said telescopic member comprises a tubular body having a bore and a rod fitted into said bore.

6. The fishing reel as set forth in claim 2, wherein said separating portions are overlapped with each other over a given length.

7. A fishing reel comprising;
a reel body having a handle projecting therefrom and a mounting leg for mounting said reel body to a fishing rod;
a cup-like shaped rotary frame rotatably supported to said reel body at the front thereof;
a spool supported to the front of said reel body by means causing said spool to move longitudinally of said reel body upon movement of said handle;
a bail arm of semicircular shape for guiding a fishing line wound on said spool including an intermediate portion and two end portions; and,
means for pivotably mounting said bail arm to said rotary frame so that said bail arm can swing with its intermediate portion passing across the front side of said spool comprising:
a pair of arm supports coupled to said rotary frame and located at opposite sides of said rotary frame,
a pair of studs respectively mounted to said arm supports, one of said studs having its axis slanted with respect to a plane lying perpendicular to the axis of rotation of said rotary frame with its head positioned outwardly of said rotary frame and facing backwardly thereof, the other of said studs being mounted to said frame by means permitting axial movement thereof with respect to said rotary frame, and
means for respectively pivotably coupling said two end portions of said bail arm to said studs, whereby when said bail arm is swung about said studs, said intermediate portion thereof is shifted radially to pass across the front side of said spool.

8. The fishing reel as set forth in claim 7, wherein the arm support for said axially movable stud is provided with a bore for rotatably supporting said axially movable stud, said bore being formed in a slot elongated axially of said rotary frame.

9. The fishing reel as set forth in claim 8, further comprising a spring inserted between the lengthwise fore end of said bore and said axially movable stud for urging said axially movable stud toward the lengthwise rear end of said bore.

10. The fishing reel as set forth in claim 7, wherein said axially movable stud comprises an extension of said bail arm.

11. A fishing reel comprising;
a reel body having a handle projecting therefrom and a mounted leg for mounting said reel body to a fishing rod;
a cup-like shaped rotary frame rotatably supported to said reel body at the front thereof;
a spool supported to the front of said reel body by means causing said spool to move longitudinally of said reel body upon movement of said handle;
a bail arm of semicircular shape for guiding a fishing line wound on said spool including an intermediate portion and two end portions; and,
means for pivotably mounted said bail arm to said rotary frame so that said bail arm can swing with its intermediate portion passing across the front side of said spool comprising:
a pair of arm supports coupled to said rotary frame and located at opposite sides of said rotary frame,
a pair of studs respectively mounted to said arm supports, at least one of said studs having its axis slanted with respect to a plane lying perpendicular to the axis of rotation of said rotary frame with its head positioned outwardly of said rotary frame and facing backwardly thereof, and
means for respectively pivotably coupling said two end portions of said bail arm to said studs, whereby when said bail arm is swung about said studs, said intermediate portion thereof is shifted radially to pass across the front side of said spool.

* * * * *